US005783735A

United States Patent [19]

Emert et al.

[11] Patent Number: 5,783,735
[45] Date of Patent: Jul. 21, 1998

[54] PROCESS FOR PREPARING POLYMERIC AMIDES USEFUL AS ADDITIVES IN FUELS AND LUBRICATING OILS

[75] Inventors: Jacob I. Emert, Brooklyn, N.Y.; Joseph V. Cusumano, Watchung, N.J.; David C. Dankworth, Whitehouse Station, N.J.; William D. Diana, Belle Mead, N.J.; William B. Eckstrom, Fanwood, N.J.; Keith R. Gorda, Little York, N.J.; Antonio Gutierrez, Mercerville, N.J.; Jon E. Stanat, Westfield, N.J.; Warren A. Thaler, Flemington, N.J.; Stephen Zushma, Clinton, N.J.

[73] Assignee: Exxon Chemical Patents Inc., Linden, N.J.

[21] Appl. No.: 441,029

[22] Filed: May 25, 1995

Related U.S. Application Data

[63] Continuation-in-part of Ser. No. 261,554, Jun. 17, 1994.

[51] Int. Cl.$^6$ .................. C07C 231/02; C10M 149/00; C10M 149/18
[52] U.S. Cl. .................. 564/134; 508/291; 508/292; 508/293; 508/444; 508/508; 508/551; 508/554; 508/555; 558/251; 558/254; 560/16; 560/41; 560/145; 560/169; 562/449; 562/450; 562/521; 562/522; 562/561; 562/565; 564/135; 564/136; 564/138; 564/139; 564/144; 564/153; 564/154; 564/155; 564/159
[58] Field of Search .................. 508/291, 292, 508/293, 444, 508, 551, 554, 555; 558/251, 254; 560/16, 41, 145, 169; 562/449, 450, 521, 522, 561, 565; 564/134, 135, 136, 138, 139, 144, 153, 154, 155, 159

[56] References Cited

U.S. PATENT DOCUMENTS

| | | | |
|---|---|---|---|
| 3,172,892 | 3/1965 | Le Suer et al. | 260/326.5 |
| 3,711,406 | 1/1973 | Lowe | 252/33.4 |
| 4,088,588 | 5/1978 | Pecoraro | 252/51.5 A |
| 4,098,585 | 7/1978 | Vartanian et al. | 44/63 |
| 4,108,945 | 8/1978 | Fetters et al. | 260/880 B |
| 4,152,499 | 5/1979 | Boerzel et al. | 526/52.4 |
| 4,219,432 | 8/1980 | Girgenti et al. | 252/51.5 A |
| 4,234,435 | 11/1980 | Meinhardt et al. | 252/51.5 A |
| 4,471,091 | 9/1984 | Hayashi | 525/71 |
| 4,735,736 | 4/1988 | Chung | 252/48.6 |
| 4,840,744 | 6/1989 | Wollenberg et al. | 252/51.5 A |
| 4,927,551 | 5/1990 | Erdman et al. | 252/42.7 |
| 4,938,881 | 7/1990 | Ripple et al. | 252/32.7 E |
| 4,952,739 | 8/1990 | Chen | 585/18 |
| 5,049,294 | 9/1991 | Van Zon et al. | 252/51.5 A |
| 5,053,152 | 10/1991 | Steckel | 252/51.5 R |
| 5,070,131 | 12/1991 | Rhodes et a. | 524/484 |
| 5,114,435 | 5/1992 | Abramo et al. | 44/348 |
| 5,137,980 | 8/1992 | DeGonia et al. | 525/327.6 |
| 5,160,648 | 11/1992 | Steckel | 252/47.5 |
| 5,164,101 | 11/1992 | Brownawell et al. | 252/25 |
| 5,171,466 | 12/1992 | Korosec | 252/51.5 A |
| 5,230,714 | 7/1993 | Steckel | 44/432 |
| 5,232,616 | 8/1993 | Harrison et al. | 252/51.5 A |
| 5,241,003 | 8/1993 | Degonia et al. | 525/123 |
| 5,334,321 | 8/1994 | Harrision et al. | 252/51.5 A |
| 5,356,552 | 10/1994 | Harrison et al. | 252/51.5 A |

FOREIGN PATENT DOCUMENTS

| | | |
|---|---|---|
| 0 475 609 A1 | 3/1992 | European Pat. Off. |
| 0 556 915 A2 | 8/1993 | European Pat. Off. |
| 0 565 285 A1 | 10/1993 | European Pat. Off. |
| WO 90/03359 | 9/1989 | WIPO |

*Primary Examiner*—Peter O'Sullivan

[57] ABSTRACT

A process for preparing polymeric amides is disclosed. The process comprises sequentially reacting a hydrocarbon polymer functionalized (e.g., via the Koch reaction) to contain acid, ester, thioacid and/or thioester groups with a heavy polyamine to form a partially derivatized product in which at least about 85% of the functional groups are converted to heavy (thio)amide groups, and then reacting the partially derivatized product with an excess of light amine to complete the derivatization by converting substantially all of the remaining functional groups to light (thio)amide groups. Products of the foregoing process are also disclosed, which products are useful as additives in fuels and in lubricants.

17 Claims, No Drawings

PROCESS FOR PREPARING POLYMERIC AMIDES USEFUL AS ADDITIVES IN FUELS AND LUBRICATING OILS

CROSS-REFERENCE

This application is a continuation-in-part of U.S. Ser. No. 261,554, filed Jun. 17, 1994, entitled "Lubricating Oils Dispersants Derived from Heavy Polyamines". This application is related to U.S. Ser. No. 441,030, Attorney Docket Number PT-1182, "Dispersants Derived from Heavy Polyamine and Second Amine", filed May 25, 1995, which is also a continuation-in-part of U.S. Ser. No. 261,554, and which is hereby incorporated by reference in its entirety for all purposes. This application is also related to U.S. Ser. No. 261,507, "Amidation of Ester Functionalized Polymers"; U.S. Ser. No. 261,557, "Prestripped Polymer Used to Improve Koch Reaction Dispersant Additives"; U.S. Ser. No. 261,559, "Batch Koch Carbonylation Process"; U.S. Ser. No. 261,534, "Derivatives of Polyamines with One Primary Amine and Secondary or Tertiary Amines"; U.S. Ser. No. 261,560, "Continuous Process for Production of Functionalized Olefins"; and U.S. Ser. No. 261,558, "Functionalized Additives Useful in Two-Cycle Engines", all filed Jun. 17, 1994, all of which contain related subject matter as indicated by their titles and are hereby incorporated by reference in their entirety for all purposes.

FIELD OF THE INVENTION

The invention relates to dispersant additives comprising polymeric amides prepared from functionalized hydrocarbon polymers reacted (e.g. derivatized) with "heavy polyamines". "Heavy polyamine" as referred to herein is a mixture of higher oligomers of amines containing essentially no pentamines, small amounts of hexamines but primarily oligomers with more than 6 nitrogens, and more branching. Use of heavy polyamine allows for incorporation of greater amounts of nitrogen into the dispersant molecule than prior art amines. The polymeric amide dispersants disclosed herein are useful as additives in fuel and lubrication oils.

BACKGROUND OF THE INVENTION

U.S. Ser. No. 992,403 discloses amidation (derivatization) of polymers functionalized by the Koch reaction with amine and is incorporated by reference herein.

Polyalkenyl succinimides are a widely used class of dispersants for lubricant and fuels applications. They are prepared by the reaction of, for example, polyisobutylene with maleic anhydride to form polyisobutenyl-succinic anhydride, and then a subsequent condensation reaction with ethylene amines. Succinimides suitable for use in lubricants and fuels are disclosed, for example, in U.S. Pat. No. 3,172,892, U.S. Pat. No. 4,234,435, U.S. Pat. No. 5,137,980, and EP-A1-565285.

Polymeric succinimides prepared using more than one amine have also been disclosed. U.S. Pat. No. 4,735,736 discloses polymeric viscosity index improver dispersant additives prepared by reacting a hydrocarbon polymer which has been grafted with an acid moiety (e.g., maleic anhydride) with a polyamine, followed by reaction with ammonia or monoamine. U.S. Pat. No. 4,219,432 discloses stable polymeric dispersant additives which are substantially saturated ethylene copolymers which have been grafted in the presence of a free radical initiator with ethylenically unsaturated dicarboxylic acid material, and thereafter partially reacted with a tertiary amino-amine having but one primary amino group and then fully reacted with α, ω-primary diamine, and then reacted with an anhydride of an organic acid.

EP-A1-0475609 discloses the use of "heavy polyamine" which is disclosed to be a mixture of polyethyleneamines sold by Union Carbide Co. under the designation Polyamine HPA-X.

U.S. Pat. No. 5,230,714 discloses the use of "polyamine bottoms" derived from an alkylene polyamine mixture. "Polyamine bottoms" are characterized as having less than two, usually less than 1% by weight of material boiling below about 200° C. In the case of ethylene polyamine bottoms, the bottoms were disclosed to contain less than abut 2% by weight total diethylene triamine (DETA) or triethylene tetraamine (TETA). A typical sample of such ethylene polyamine from Dow Chemical Company, designated as "E-100" was disclosed to have a percent nitrogen by weight of 33.15 and gas chromatography analysis showed it to contain about 0.93% "Light Ends" (DETA), 0.72% TETA, 21.74% tetraethylene pentamine and 76.61% pentaethylene hexamine and higher (by weight).

U.S. Pat. No. 4,938,881 similarly discloses the use of "polyamine bottoms".

U.S. Pat. No. 5,164,101 discloses the polybutenylsuccinimide of polyamines, wherein the polyamine has a specific formula.

U.S. Pat. No. 5,114,435 discloses a polyalkylenesuccinimide prepared from a polyalkylenesuccinnic acid or anhydride reacted with a polyalkylene polyamine of a specific formula. Hexaethylene heptamine is disclosed to be a suitable amine.

U.S. Pat. No. 4,927,551 discloses a polybutenyl succinnic anhydride reacted with Dow E-100 heavy polyamine (weight average molecular weight ("$\overline{M}_w$")=303, available from Dow Chemical Company).

U.S. Pat. No. 5,241,003 discloses succinimides derived from amines of a specific formula. Various suitable low cost polyethylene polyamine mixtures are disclosed to be available under various trade designations such as "Polyamine H", "Polyamine 400", "Dow Polyamine E-100" and "Dow S-1107".

SUMMARY OF THE INVENTION

The present invention relates to dispersant additives comprising polymeric amides prepared from functionalized hydrocarbon polymers reacted (e.g. derivatized) with "heavy polyamines". The present invention is directed to a process for preparing polymeric amides useful as additives in fuels and in lubricating oils by sequentially reacting functionalized hydrocarbon polymers with heavy polyamine and then with light amine. More particularly, the present invention is a process for preparing a polymeric amide comprising the steps of:

(A) reacting (i) a hydrocarbon polymer functionalized to contain functional groups of the formula —CO—Y—R$^3$, the hydrocarbon polymer having a number average molecular weight of at least about 500 prior to functionalization, wherein Y is O or S, R3 is hydrogen, hydrocarbyl, or substituted hydrocarbyl and wherein at least 50 mole % of the functional groups are attached to a tertiary carbon atom of the polymer backbone, with (ii) a heavy polyamine in an amount and under conditions effective to form a partially derivatized product in which at least about 85% but less than all of the functional groups are converted to heavy amide groups; and (B) reacting the partially derivatized product with an excess of a light amine having 2 to about 6 carbon atoms and 1 to about 3 amino groups per molecule, at least one of the amino groups being a primary amino group, under conditions effective to convert substantially all remaining functional groups to light amide groups.

The present invention also includes polymeric amides formed or otherwise obtainable by the foregoing process.

The hydrocarbon polymers are functionalized using the Koch reaction, then partially derivatized using a heavy polyamine, and then fully derivatized using a light amine.

The heavy polyamine as the term is used herein contains more than six nitrogens per molecule, but preferably polyamine oligomers containing seven or more nitrogens per molecule. The heavy polyamine comprises more than 28 wt. % (e.g.>32 wt. %) total nitrogen and an equivalent weight of primary amine groups of 120 to 160 grams per equivalent. Commercial dispersants are based on the reaction of carboxylic acid moieties with a polyamine such as tetraethylenepentamine (TEPA) with five nitrogens per molecule. Commercial TEPA is a distillation cut and contains oligomers with three and four nitrogens as well. Other commercial polyamines known generically as PAM, contain a mixture of ethylene amines where TEPA and pentaethylene hexamine (PEHA) are the major part of the polyamine. Typical PAM is commercially available from the Dow Chemical Company under the trade name E-100 or from the Union Carbide Company as HPA-X. This mixture typically consists of less than 1.0 wt. % low molecular weight amine, 10–15 wt. % tetraethylenepentamines (TEPA), 40–50% pentaethylene hexane (PEHA) and the balance hexaethylene heptamine (HEHA) and higher oligomers. Typically PAM has 8.7–8.9 milliequivalents of primary amine per gram (an equivalent weight of 112–115 grams per equivalent of primary amine) and a total nitrogen content of about 33–34 wt. %.

It has been discovered that heavier cuts of PAM oligomers with practically no TEPA and only very small amounts of PEHA but containing primarily oligomers with more than 6 nitrogens and more extensive branching produce dispersants with improved dispersancy when compared to products derived from regular commercial PAM under similar conditions with the same polymer backbones. An example of one of these heavy polyamine compositions is commercially available from the Dow Chemical Company under the trade name of Polyamine HA-2.

HA-2 is prepared by distilling out all the lower boiling ethylene amine oligomers (light ends) including TEPA. The TEPA content is less than 1 wt. %. Only a small amount of PEHA, less than 25 wt. %, usually 5–15 wt. %, remains in the mixture. The balance is higher nitrogen content oligomers with great degree of branching. The heavy polyamine preferably comprises essentially no oxygen.

Typical analysis of HA-2 gives primary nitrogen values of 7.8 milliequivalents (meq) (e.g. 7.7 to 7.8) of primary amine per gram of polyamine. This calculates to be about an equivalent weight (EW) of 128 grams per equivalent (g/eq). The total nitrogen content is about 32.0–33.0 wt. %. Commercial PAM analyzes for 8.7–8.9 meq of primary amine per gram of PAM and a nitrogen content of about 33 to 34 wt. %.

The present invention uses "heavy" polyamine which contains primarily oligomers higher than pentaethylene hexamine, to produce dispersants that are superior to dispersants made from conventional PAM which contain lower molecular weight amine oligomers.

The light amine used to complete the derivatization of the functionalized hydrocarbon is defined herein as an amine compound having 2 to about 6 carbon atoms and 1 to about 3 amino groups, at least one of the amino groups being a primary amino group, or mixtures of such amine compounds.

In a preferred embodiment, the process of the invention further comprises removing unreacted light amine from the polymeric amide product after completing the derivatization of the functionalized hydrocarbon; i.e., after conversion of substantially all functional groups in the partially derivatized product obtained by reaction with heavy polyamine. The light amine is typically removed by distillation, nitrogen sparging, or other separation methods which take advantage of its volatility relative to the polymeric amide product. Accordingly, light amine is alternatively referred to herein as volatile amine.

DETAILED DESCRIPTION OF THE INVENTION

The present invention relates to a derivatization (amidation), by sequentially using (reacting) a heavy polyamine and a light amine with functionalized hydrocarbon polymer wherein the polymer backbone has $\overline{M}_n \geq 500$. functionalization is by groups of the formula:

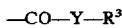

wherein Y is O or S, and $R^3$ is H, hydrocarbyl, or substituted hydrocarbyl and, optionally, at least 50 mole % of the functional groups are attached to a tertiary carbon atom of the polymer backbone (i.e., at least 50 mole % of the functional groups are "neo" groups). $R^3$ is preferably aryl or substituted hydrocarbyl, and more preferably aryl or substituted aryl.

Thus the functionalized polymer may be depicted by the formula:

wherein POLY is a backbone derived from a hydrocarbon polymer having a number average molecular weight of at least 500. n is a number greater than 0. $R^1$ and $R^2$ are independently the same or different and are each H or hydrocarbyl with the proviso that $R^1$ and $R^2$ are selected such that in at least 50 mole % of the —$CR^1R^2$— groups both $R^1$ and $R^2$ are not H (i.e., at least 50 mole % of the —CO—Y—$R^3$ groups are "neo" groups), and R3 is as defined in the preceding paragraph.

As used herein the term "hydrocarbyl" denotes a group having a carbon atom directly attached to the remainder of the molecule and having predominantly hydrocarbon character within the context of this invention and includes polymeric hydrocarbyl radicals. Such radicals include aliphatic (e.g., alkyl or alkenyl), alicyclic (e.g., cycloalkyl or cycloalkenyl) and aromatic, aliphatic and alicyclic-substituted aromatic, and aromatic-substituted aliphatic and alicyclic radicals, and the like, as well as cyclic radicals wherein the ring is completed through another portion of the molecule (that is, the two indicated substituents may together form a cyclic radical). Any hydrocarbyl radical containing aromatic is broadly referred to herein as "aryl". The hydrocarbyl radicals can contain non-hydrocarbon substituents (e.g., halo, hydroxy, alkoxy, carbalkoxy, nitro, alkylsulfoxy) or hetero groups to the extent they do not alter the predominantly hydrocarbon character of the radical.

In general, no more than about three substituents or hetero atoms, and preferably no more than one, will be present for each 10 carbon atoms in the hydrocarbon-based radical.

Polymeric hydrocarbyl radicals are those derived from hydrocarbon polymers, which may be substituted and/or contain hetero atoms provided that they remain predominantly hydrocarbon in character.

Conversely, as used herein, the term "substituted hydrocarbyl" denotes a radical having a carbon atom directly attached to the remainder of the molecule, wherein the character of the radical is not predominantly hydrocarbon due to the presence of non-hydrocarbon substituents, such as those noted above in describing "hydrocarbyl", or heteroatom groups in the radical. Any substituted hydrocarbyl radical containing aromatic is broadly referred to herein as "substituted aryl".

The functionalized polymer may be derived from a hydrocarbon polymer comprising non-aromatic carbon-carbon double bond, also referred to as an olefinically unsaturated bond, or an ethylenic double bond. The polymer is functionalized at that double bond via a Koch reaction to form the carboxylic acid, carboxylic ester or thio acid or thio ester.

In the Koch process as practiced herein, a polymer having at least one ethylenic double bond is contacted with an acid catalyst and carbon monoxide in the presence of a nucleophilic trapping agent such as water or alcohol. The catalyst is preferably a classical Broensted acid or Lewis acid catalyst. These catalysts are distinguishable from the transition metal catalyst of the type described in the prior art. The Koch reaction, as applied to the present invention, may result in good yields of functionalized polymer, even 90 mole % or greater.

POLY, in general formula (I), represents a hydrocarbon polymer backbone having $\overline{M}_n$ of at least 500. $\overline{M}_n$ may be determined by available techniques such as gel permeation chromatography (GPC).

POLY is derived from unsaturated polymer; i.e., POLY is derived from a hydrocarbon polymer having $\overline{M}_n$ of at least about 500 prior to functionalization.

Polymers

The polymers which are useful in the present invention are hydrocarbon polymers containing at least one carbon-carbon double bond (olefinic or ethylenic) unsaturation. Thus, the maximum number of functional groups per polymer chain is limited by the number of double bonds per chain. Such polymers have been found to be receptive to Koch mechanisms to form carboxylic acids or derivatives thereof, using the catalysts and nucleophilic trapping agents of the present invention.

Useful polymers in the present invention include polyalkenes including homopolymer, copolymer (used interchangeably with interpolymer) and mixtures. Homopolymers and interpolymers include those derived from polymerizable olefin monomers of 2 to about 16 carbon atoms; usually 2 to about 6 carbon atoms.

Particular reference is made to the alpha olefin polymers made using organo metallic coordination compounds. A particularly preferred class of polymers are ethylene alpha olefin copolymers such as those disclosed in U.S. Pat. No. 5,017,299. The polymer unsaturation can be terminal, internal or both. Preferred polymers have terminal unsaturation, preferably a high degree of terminal unsaturation. Terminal unsaturation is the unsaturation provided by the last monomer unit located in the polymer. The unsaturation can be located anywhere in this terminal monomer unit. Terminal olefinic groups include vinylidene unsaturation, $R^aR^bC=CH_2$; trisubstituted olefin unsaturation, $R^aR^bC=CR^cH$; vinyl unsaturation, $R^aHC=CH_2$; 1,2-disubstituted terminal unsaturation, $R^aHC=CHR^b$; and tetra-substituted terminal unsaturation, $R^aR^bC=CR^cR$. At least one of $R^a$ and $R^b$ is a polymeric group of the present invention, and the remaining $R^b$, $R^c$ and $R^d$ are hydrocarbon groups as defined with respect to $R^1$, $R^2$, and $R^3$ above.

Low molecular weight polymers, also referred to herein as dispersant range molecular weight polymers, are polymers having $\overline{M}_n$ less than 20,000, preferably 500 to 20,000 (e.g. 1,000 to 20,000), more preferably 1,500 to 10,000 (e.g. 2,000 to 8,000) and most preferably from 1,500 to 5,000. The number average molecular weights are measured by vapor phase osmometry. Low molecular weight polymers are useful in forming dispersants for lubricant additives.

Medium molecular weight polymers have $\overline{M}_n$'s ranging from 20,000 to 200,000, preferably 25,000 to 100,000; and more preferably, from 25,000 to 80,000, and are useful for viscosity index improvers for lubricating oil compositions, adhesive coatings, tackifiers and sealants. The medium $\overline{M}_n$ can be determined by membrane osmometry.

The higher molecular weight materials have $\overline{M}_n$ of greater than about 200,000 and can range to 15,000,000 with specific embodiments of 300,000 to 10,000,000 and more specifically 500,000 to 2,000,000. These polymers are useful in polymeric compositions and blends including elastomeric compositions. Higher molecular weight materials having $\overline{M}_n$'s of from 20,000 to 15,000,000 can be measured by gel permeation chromatography with universal calibration, or by light scattering. The values of the ratio $\overline{M}_w/\overline{M}_n$, referred to as molecular weight distribution ("MWD"), are not critical. However, a typical minimum $\overline{M}_w/\overline{M}_n$ value of about 1.1–2.0 is preferred with typical ranges of about 1.1 up to about 4.

The olefin monomers are preferably polymerizable terminal olefins; that is, olefins characterized by the presence in their structure of the group —R—C=CH$_2$, where R is H or a hydrocarbon group. However, polymerizable internal olefin monomers (sometimes referred to in the patent literature as medial olefins) characterized by the presence within their structure of the group:

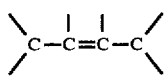

can also be used to form the polyalkenes. When internal olefin monomers are employed, they normally will be employed with terminal olefins to produce polyalkenes which are interpolymers. For this invention, a particular polymerized olefin monomer which can be classified as both a terminal olefin and an internal olefin, will be deemed a terminal olefin. Thus, pentadiene-1,3 (i.e., piperylene) is deemed to be a terminal olefin.

As the term is used herein, "hydrocarbon polymer" includes polymers (e.g., polyalkenes) which contain non-hydrocarbon substituents, such as lower alkoxy (lower=1 to 7 carbon atoms); lower alkyl mercapto, hydroxy, mercapto, and carbonyl, wherein the non-hydrocarbon moieties do not substantially interfere with the functionalization and derivatization reactions of this invention. Such substituents typically contribute not more than about 10 wt. % of the total weight of the hydrocarbon polymer (e.g., polyalkene).

The polyalkenes may include aromatic groups and cycloaliphatic groups such as would be obtained from polymerizable cyclic olefins or cycloaliphatic substituted-polymerizable acrylic olefins. There is a general preference for polyalkenes free from aromatic and cycloaliphatic groups (other than the diene styrene interpolymer exception already noted). There is a further preference for polyalkenes derived from homopolymers and interpolymers of terminal hydrocarbon olefins of 2 to 16 carbon atoms. This further preference is qualified by the proviso that, while interpolymers of terminal olefins are usually preferred, interpolymers optionally containing up to about 40% of polymer units derived from internal olefins of up to about 16 carbon atoms are also within a preferred group. A more preferred class of polyalkenes are those selected from the group consisting of homopolymers and interpolymers of terminal olefins of 2 to 6 carbon atoms, more preferably 2 to 4 carbon atoms. However, another preferred class of polyalkenes are the latter, more preferred polyalkenes optionally containing up to about 25% of polymer units derived from internal olefins of up to about 6 carbon atoms.

Specific examples of terminal and internal olefin monomers which can be used to prepare the polyalkenes according to conventional, well-known polymerization techniques include ethylene; propylene; butene-1; butene-2; isobutene; pentene-1; etc.; propylenetetramer; diisobutylene; isobutylene trimer; butadiene-1,2; butadiene-1,3; pentadiene-1,2; pentadiene-1,3; etc. Specific examples of polyalkenes include polypropylenes, polybutenes, ethylene-propylene copolymers, ethylene-butene copolymers, propylene-butene copolymers, styrene-isobutene copolymers, isobutene-butadiene-1,3 copolymers, etc., and terpolymers of isobutene, styrene and piperylene and copolymer of 80% of ethylene and 20% of propylene. A useful source of polyalkenes are the poly(isobutene)s obtained by polymerization of $C_4$ refinery stream having a butene content of about 35 to about 75% by wt., and an isobutene content of about 30 to about 60% by wt., in the presence of a Lewis acid catalyst such as aluminum trichloride or boron trifluoride.

Also useful are the high molecular weight poly-n-butenes of U.S. Ser. No. 992,871 filed Dec. 17, 1992. A preferred source of monomer for making poly-n-butenes is petroleum feedstreams such as Raffinate II. These feedstocks are disclosed in the art such as in U.S. Pat. No. 4,952,739.

Ethylene Alpha-Olefin Copolymer

Preferred polymers are polymers of ethylene and at least one alpha-olefin having the formula $H_2C=CHR^4$ wherein $R^4$ is straight chain or branched chain alkyl radical comprising 1 to 18 carbon atoms and wherein the polymer contains a high degree of terminal ethenylidene unsaturation. Preferably $R^4$ in the above formula is alkyl of from 1 to 8 carbon atoms and more preferably is alkyl of from 1 to 2 carbon atoms. Therefore, useful comonomers with ethylene in this invention include propylene, 1-butene, hexene-1, octene-1, etc., and mixtures thereof (e.g. mixtures of propylene and 1-butene, and the like). Preferred polymers are copolymers of ethylene and propylene and ethylene and butene-1.

The polymers can optionally contain units derived from a non-conjugated diene such as dicyclopentadiene, 1,4-hexadiene, and ethylidene norbornene, as well as others as are well known in the art.

The molar ethylene content of the polymers employed is preferably in the range of between about 20 and about 80%, and more preferably between about 30 and about 70%. When butene-1 is employed as comonomer with ethylene, the ethylene content of such copolymer is most preferably between about 20 and about 45 wt %, although higher or lower ethylene contents may be present. The most preferred ethylene-butene-1 copolymers are disclosed in U.S. Ser. No. 992,192, filed Dec. 17, 1992, and incorporated herein by reference in its entirety. The preferred method for making low molecular weight ethylene/α-olefin copolymer is described in U.S. Ser. No. 992,690, filed Dec. 17, 1992.

Preferred ranges of number average molecular weights of polymer for use as precursors for dispersants are from about 500 to 10,000; preferably from about 1,000 to 8,000 (e.g. from about 1,500 to 5,000); most preferably from about 2,500 to 6,000. A convenient method for such determination is by size exclusion chromatography (also known as gel permeation chromatography (GPC)) which additionally provides molecular weight distribution information. Such polymers generally possess an intrinsic viscosity (as measured in tetralin at 135° C.) of between 0.025 and 0.6 dl/g, preferably between 0.05 and 0.5 dl/g, most preferably between 0.075 and 0.4 dl/g.

The preferred ethylene alpha-olefin polymers are further characterized in that up to about 95% and more of the polymer chains possess terminal vinylidene-type unsaturation. Thus, one end of such polymers will be of the formula POLY-C($R^{11}$)=$CH_2$ wherein $R^{11}$ is $C_1$ to $C_{18}$ alkyl, preferably $C_1$ to $C_8$ alkyl, and more preferably methyl or ethyl and wherein POLY represents the polymer chain. A minor amount of the polymer chains can contain terminal ethenyl unsaturation, i.e. POLY-CH=$CH_2$, and a portion of the polymers can contain internal monounsaturation, e.g. POLY-CH=CH($R^{11}$), wherein $R^{11}$ is as defined above.

The preferred ethylene alpha-olefin polymer comprises polymer chains, at least about 30% of which possess terminal vinylidene unsaturation. Preferably at least about 50%, more preferably at least about 60%, and most preferably at least about 75% (e.g. 75 to 98%), of such polymer chains exhibit terminal vinylidene unsaturation. The percentage of polymer chains exhibiting terminal vinylidene unsaturation may be determined by FTIR spectroscopic analysis, titration, HNR, or C-13 NMR.

Another preferred class of polymers are alpha-olefin polymers; i.e., alpha olefin homopolymers of an alpha-olefin of formula $H_2C=CHR^4$ and alpha-olefin interpolymers of two or more alpha-olefins of formula $H_2C=CHR^4$, wherein $R^4$ is as defined above. The preferred alpha-olefin monomers are butene-1 and propylene and preferred alpha-olefin polymers are polypropylene, polybutene-1 and butene-1-propylene copolymer (e.g., butene-1-propylene copolymers having 5 to 40 mole % propylene). Preferred alpha-olefin polymers comprise polymer chains possessing high terminal unsaturation; i.e., at least about 30%, preferably at least about 50%, more preferably at least about 60%, and most preferably at least about 75% (e.g., 75 to 98%) of the chains have terminal vinylidene unsaturation.

The polymers can be prepared by polymerizing monomer mixtures comprising the corresponding monomers (e.g., ethylene with other monomers such as alpha-olefins, preferably from 3 to 4 carbon atoms) in the presence of a metallocene catalyst system comprising at least one metallocene (e.g., a cyclopentadienyl-transition metal compound) and an activator, e.g. alumoxane compound. The comonomer content can be controlled through selection of the metallocene catalyst component and by controlling partial pressure of the monomers.

The polymer for use in the present invention can include block and tapered copolymers derived from monomers comprising at least one conjugated diene with at least monovinyl aromatic monomer, preferably styrene. Such polymers should not be completely hydrogenated so that the polymeric composition contains olefinic double bonds, preferably at least one bond per molecule. The present invention can also include star polymers as disclosed in patents such as U.S. Pat. No. 5,070,131; U.S. Pat. No. 4,108,945; U.S. Pat. No. 3,711,406; and U.S. Pat. No. 5,049,294.

Functionalized Polymer

The polymers can be functionalized to contain —CO—Y—$R^3$ groups by any suitable functionalization chemistry, such as by reacting the polymer with an unsaturated carboxylic compound under thermal "ene" conditions or in the presence of a free radical initiator. The polymers are preferably functionalized by carbonylation via the Koch reaction as disclosed in U.S. Ser. No. 992,403, filed Dec. 17, 1992.

The letter n in Formula (I) is greater than 0 and represents the functionality (F) or average number of functional groups per polymer chain. Thus, functionality can be expressed as the average number of moles of functional groups per "mole of polymer". It is to be understood that the term "mole of polymer" includes both functionalized and unfunctionalized polymer, so that F which corresponds to n of Formula (I). The functionalised polymer will include molecules having no functional groups. Specific preferred embodiments of n include $1 \geq n > 0$; $2 \geq n > 1$; and $n > 2$. n can be determined by C-13 NMR. The optimum number of functional groups needed for desired performance will typically increase with number average molecular weight of the polymer. The maximum value of n will be determined by the number of double bonds per polymer chain in the unfunctionalized polymer.

In specific and preferred embodiments the "leaving group" ($—YR^3$) has a pKa of less than or equal to 12, preferably less than 10, and more preferably less than 8. The pKa is determined from the corresponding acidic species $HY—R^3$ in water at room temperature. Where the leaving group is a simple acid or alkyl ester, the functionalized polymer is very stable especially as the % neo substitution increases.

The "neo" functionalized polymers used in the present invention are generally more stable than iso structures. The polymer can be at least 50, preferably at least 60, more preferably at least 80 mole percent neofunctionalised. The polymer can be greater than 90, or 99 and even about 100 mole percent neo.

In one preferred composition of the polymer defined by formula (I), Y is O (oxygen), $R^1$ and $R^2$ can be the same or different and are selected from H, a hydrocarbyl group, and a polymeric group. In another preferred embodiment Y is O or S, $R^1$ and $R^2$ can be the same or different and are selected from H, a hydrocarbyl group, a substituted hydrocarbyl group and a polymeric group, and $R^3$ is selected from an aromatic group (aryl group) and a substituted hydrocarbyl group, or from an aryl group and a substituted aromatic group (substituted aryl group). This embodiment is generally more reactive towards derivatization with the heavy amines of the present invention especially where the $R^3$ substituent contains electron withdrawing species. It has been found that in this embodiment, a preferred leaving group,—$YR^3$, has a corresponding acidic species $HYR^3$ with a pKa of less than 12, preferably less than 10 and more preferably 8 or less. pKa values can range typically from 5 to 12, preferably from 6 to 10, and most preferably from 6 to 8. The pKa of the leaving group determines how readily the system will react with derivatizing compounds to produce derivatized product.

In a particularly preferred composition, $R^3$ is represented by the formula:

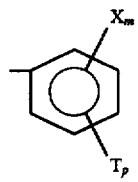

(I)

wherein X, which may be the same or different, is an electron withdrawing substituent, T, which may be the same or different, represents a non-electron withdrawing substituent (e.g. electron donating), and m and p are from 0 to 5 with the sum of m and p being from 0 to 5. More preferably, m is from 1 to 5 and preferably 1 to 3. In a particularly preferred embodiment X is selected from a halogen, preferably F or Cl, $CF_3$, cyano groups and nitro groups and p=0. A preferred $R^3$ is derived from 2,4-dichlorophenol.

The present invention includes the derivatized polymer which is the reaction product formed by sequentially reacting the Koch functionalized polymer with a first derivatizing compound (e.g., heavy amine) and then with a second derivatizing compound (e.g., light amine). Derivatized polymer will typically contain at least amide. The suitability for a particular end use may be improved by appropriate selection of the polymer $\overline{M}_n$ and functionality used in the derivatised polymer as discussed hereinafter.

The Koch reaction permits controlled functionalization of unsaturated polymers. When a carbon of the carbon-carbon double bond is substituted with hydrogen, it will result in an "iso" functional group, i.e. one of $R^1$ or $R^2$ of Formula I is H; or when a carbon of the double bond is fully substituted with hydrocarbyl groups it will result in an "neo" functional group, i.e. both $R^1$ or $R^2$ of Formula I are non-hydrogen groups.

Polymers produced by processes which result in a terminally unsaturated polymer chain can be functionalized to a relatively high yield in accordance with the Koch reaction. It has been found that the neo acid functionalized polymer can be derivatized to a relatively high yield.

The Koch process also makes use of relatively inexpensive materials i.e., carbon monoxide at relatively low temperatures and pressures. Also the leaving group compound $HYR^3$ can be removed and recycled upon derivatizing the Koch functionalized polymer with the heavy amine.

The derivatized polymers of the present invention are useful as lubricant additives such as dispersants, viscosity improvers and multifunctional viscosity improvers. The present invention includes oleaginous compositions comprising the above derivatized polymer. Such compositions include lubricating oil compositions and concentrates.

A process for functionalizing the hydrocarbon polymer comprises the step of catalytically reacting in admixture:

(a) at least one hydrocarbon polymer having a number average molecular weight of at least about 500, and an average of at least one ethylenic double bond per polymer chain;

(b) carbon monoxide, (c) at least one acid catalyst, and (d) a nucleophilic trapping agent selected from the group consisting of water, hydroxy-containing compounds and thiol-containing compounds, the reaction being conducted a) in the absence of reliance on transition metal as a catalyst; or b) with at least one acid catalyst having a Hammett acidity of less than −7; or c) wherein functional groups are formed at at least 40 mole % of the ethylenic double bonds; or d) wherein the nucleophilic trapping agent has a pKa of less than 12.

The process relates to a polymer having at least one ethylenic double bond reacted via a Koch mechanism to form carbonyl or thio carbonyl group-containing compounds, which is subsequently derivatized in accordance with the present invention. The polymers react with carbon monoxide in the presence of an acid catalyst or a catalyst preferably complexed with the nucleophilic trapping agent. A preferred catalyst is $BF_3$ and preferred catalyst complexes include $BF_3H_2O$ and $BF_3$ complexed with 2,4-dichlorophenol. The starting polymer reacts with carbon monoxide at points of unsaturation to form either iso- or neo- acyl groups with the nucleophilic trapping agent, e.g. with water, alcohol (preferably a substituted phenol) or thiol to form respectively a carboxylic acid, carboxylic ester group, or thio ester.

In a preferred process, at least one polymer having at least one carbon-carbon double bond is contacted with an acid catalyst or catalyst complex having a Hammett Scale acidity value of less than −7, preferably from −8.0 to −11.5 and most preferably from −10 to −11.5. Without wishing to be bound by any particular theory, it is believed that a carbenium ion may form at the site of one of carbon-carbon double bonds. The carbenium ion may then react with carbon monoxide to form an acylium cation. The acylium cation may react with at least one nucleophilic trapping agent as defined herein.

At least 40 mole %, preferably at least 50 mole %, more preferably at least 80 mole %, and most preferably 90 mole % of the polymer double bonds will react to form acyl groups wherein the non-carboxyl portion of the acyl group is determined by the identity of the nucleophilic trapping agent, i.e. water forms acid, alcohol forms acid ester and thiol forms thio ester. The polymer functionalized by the recited process of the present invention can be isolated using fluoride salts. The fluoride salt can be selected from the group consisting of ammonium fluoride, and sodium fluoride.

Preferred nucleophilic trapping agents are selected from the group consisting of water, monohydric alcohols, polyhydric alcohols hydroxyl-containing aromatic compounds and hetero substituted phenolic compounds. The catalyst and nucleophilic trapping agent can be added separately or combined to form a catalytic complex.

Following is an example of a terminally unsaturated polymer reacted via the Koch mechanism to form an acid or an ester. The polymer is contacted with carbon monoxide or a suitable carbon monoxide source such as formic acid in the presence of an acidic catalyst. The catalyst contributes a proton to the carbon-carbon double bond to form a carbenium ion. This is followed by addition of CO to form an acylium ion which reacts with the nucleophilic trapping agent. POLY, Y, $R^1$, $R^2$ and $R^3$ are defined as above.

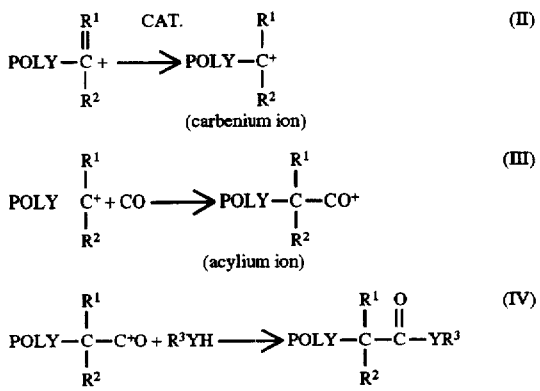

The Koch reaction is particularly useful to functionalize poly(alpha olefins) and ethylene alpha olefin copolymers formed using metallocene-type catalysts. These polymers contain terminal vinylidene groups. There is a tendency for such terminal groups to predominate and result in neo-type (tertiary) carbenium ions. In order for the carbenium ion to form, the acid catalyst is preferably relatively strong. However, the strength of the acid catalyst is preferably balanced against detrimental side reactions which can occur when the acid is too strong.

The Koch catalyst can be employed by preforming a catalyst complex with the proposed nucleophilic trapping agent or by adding the catalyst and trapping agent separately to the reaction mixture. This later embodiment has been found to be a particular advantage since it eliminates the step of making the catalyst complex.

The following are examples of acidic catalyst and catalyst complex materials with their respective Hammett Scale Value acidity: 60% $H_2SO_4$, −4.32; $BF_3 \cdot 3H_2O$, −4.5; $BF_3 \cdot 2H_2O$, −7.0; $WO_3/Al_2O_3$, less than −8.2; $SiO_2/Al_2O_3$, less than −8.2; HF, −10.2; $BF_3 \cdot H_2O$, −11.4 to −11.94; $ZrO_2$ less than −12.7, $SiO_2/Al_2O_3$, −12.7 to −13.6; $AlCl_3$, −13.16 to −13.75; $AlCl_3/CuSO_4$, −13.75 to −14.52.

It has been found that $BF_3 \cdot 2H_2O$ is ineffective at functionalizing polymer through a Koch mechanism. In contrast, $BF_3 \cdot H_2O$ resulted in high yields of carboxylic acid for the same reaction. The use of $H_2SO_4$ as a catalyst involves control of the acid concentration to achieve the desired Hammett Scale Value range. Preferred catalysts are $H_2SO_4$ and $BF_3$ catalyst systems.

Suitable $BF_3$ catalyst complexes for use in the present invention can be represented by the formula:

$$BF_3 \cdot xHOR$$

wherein R can represent hydrogen, hydrocarbyl (as defined below in connection with R') —CO—R', —$SO_2$—R', —PO—$(OH)_2$, and mixtures thereof wherein R' is hydrocarbyl, typically alkyl, e.g., $C_1$ to $C_{20}$ alkyl, and, e.g., $C_6$ to $C_{14}$ aryl, aralkyl, and alkaryl, and x is less than 2.

Following reaction with CO, the reaction mixture is further reacted with water or another nucleophilic trapping agent such as an alcohol or phenolic, or thiol compound. The use of water releases the catalyst to form an acid. The use of hydroxy trapping agents releases the catalyst to form an ester, the use of a thiol releases the catalyst to form a thio ester.

Koch product, also referred to herein as functionalized polymer, is typically derivatized as described hereinafter. Derivatization reactions involving ester functionalized polymer will typically have to displace the alcohol derived moiety therefrom. Consequently, the alcohol derived portion of the Koch functionalized polymer is sometimes referred to herein as a leaving group. The ease with which a leaving group is displaced during derivatization will depend on its acidity, i.e. the higher the acidity the more easily it will be displaced. The acidity in turn of the alcohol is expressed in terms of its pKa (in water at 25° C.).

Preferred nucleophilic trapping agents include water and hydroxy group containing compounds. Useful hydroxy trapping agents include aliphatic compounds such as monohydric and polyhydric alcohols or aromatic compounds such as phenols and naphthols. The aromatic hydroxy compounds from which the esters of this invention may be derived are illustrated by the following specific example: phenol, -naphthol, cresol, resorcinol, catechol, 2-chlorophenol. Particularly preferred is 2,4-dichlorophenol.

The alcohols preferably can contain up to about 40 aliphatic carbon atoms. They may be monohydric alcohols such as methanols, ethanol, benzyl alcohol, 2-methylcyclohexanol, beta-chloroethanol, monomethyl ether of ethylene glycol, etc. The polyhydric alcohols preferably contain from 2 to about 5 hydroxy radicals; e.g., ethylene glycol, diethylene glycol. Other useful polyhydric alcohols include glycerol, monomethyl ether of glycerol,and pentaerythritol. Useful unsaturated alcohols include allyl alcohol, and propargyl alcohol.

Particularly preferred alcohols include those having the formula $R*_2CHOH$ where an $R*$ is independently hydrogen, an alkyl, aryl, hydroxyalkyl, or cycloalkyl. Specific alcohols include alkanols such as methanol, ethanol, etc. Also preferred useful alcohols include aromatic alcohols, phenolic compounds and polyhydric alcohols as well as monohydric alcohols such as 1,4-butanediol.

It has been found that neo-acid ester functionalized polymer is extremely stable due, it is believed, to steric hindrance. Consequently, the yield of derivatized polymer obtainable therefrom will vary depending on the ease with which a derivatizing compound can displace the leaving group of the functionalized polymer.

The yield of derivatized hydrocarbon or polymer can be significantly enhanced by controlling the acidity of the leaving group, e.g., the alcohol derived portion of the ester functionalized polymer. Thus, while any acidity which is effective to enable the leaving group —$YR^3$ of Formula (I) to be displaced during derivatization can be employed, it is contemplated that such effective acidities, expressed as the pKa of the compound $HYR^3$ in water at 25° C., be typically not greater than about 12, preferably not greater than about 10, and most preferably not greater than about 8, which pKa values can range typically from about 5 to about 12, preferably from about 6 to about 10, and most preferably from about 6 to about 8.

The most preferred alcohol trapping agents may be obtained by substituting a phenol with at least one electron withdrawing substituent such that the substituted phenol possesses a pKa within the above described preferred pKa ranges. In addition, phenol may also be substituted with at least one non-electron withdrawing substituent (e.g., electron donating), preferably at positions meta to the electron withdrawing substituent to block undesired alkylation of the phenol by the polymer during the Koch reaction. This further improves yield to desired ester functionalized polymer.

Accordingly, and in view of the above, the most preferred trapping agents are phenolic and substituted phenolic compounds represented by the formula:

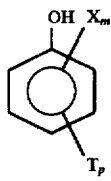

(V)

wherein X, which may be the same or different, is an electron withdrawing substituent, and T which may be the same or different is a non-electron withdrawing group, m and p are from 0 to 5 with the sum of m and p being from 0 to 5, and m is preferably from 1 to 5, and more preferably, m is 1 or 2. X is preferably a group selected from halogen, cyano, and nitro, preferably located at the 2- and/or 4- position, and T is a group selected from hydrocarbyl, and hydroxy groups and p is 1 or 2 with T preferably being located at the 4 and/or 6 position. More preferably X is selected from Cl, F, Br, cyano or nitro groups and m is preferably from 1 to 5, more preferably from 1 to 3, yet more preferably 1 to 2, and most preferably 2 located at the 2 and 4 locations relative to —OH.

The relative amounts of reactants and catalyst, and the conditions controlled in a manner sufficient to functionalize typically at least about 40, preferably at least about 80, more preferably at least about 90 and most preferably at least about 95 mole % of the carbon-carbon double bonds initially present in the unfunctionalized polymer.

The amount of $H_2O$, alcohol, or thiol used is preferably at least the stoichiometric amount required to react with the acylium cations. It is preferred to use an excess of alcohol over the stoichiometric amount. The alcohol performs the dual role of reactant and diluent for the reaction. However, the amount of the alcohol or water used should be sufficient to provide the desired yield yet at the same time not dilute the acid catalyst so as to adversely affect the Hammett Scale Value acidity.

The polymer added to the reactant system can be in a liquid phase. Optionally, the polymer can be dissolved in an inert solvent. The yield can be determined upon completion of the reaction by separating polymer molecules which contain acyl groups which are polar and hence can easily be separated from unreacted non-polar compounds. Separation can be performed using absorption techniques which are known in the art. The amount of initial carbon-carbon double bonds and carbon-carbon double bonds remaining after the reaction can be determined by C-13 NMR techniques.

In accordance with the process, the polymer is heated to a desired temperature range which is typically between –20° C. to 200° C., preferably from 0° C. to 80° C. and more preferably from 40° C. to 65° C. Temperature can be controlled by heating and cooling means applied to the reactor. Since the reaction is exothermic usually cooling means are required. Mixing is conducted throughout the reaction to assure a uniform reaction medium.

The catalyst (and nucleophilic trapping agent) can be prereacted to form a catalyst complex or are charged separately in one step to the reactor to form the catalyst complex in situ at a desired temperature and pressure, preferably under nitrogen. In a preferred system the nucleophilic trapping agent is a substituted phenol used in combination with $BF_3$. The reactor contents are continuously mixed and then rapidly brought to a desired operating pressure using a high pressure carbon monoxide source. Useful pressures can be up to 138000 kPa (20,000 psig), and typically will be at least 2070 kPa (300 psig), preferably at least 5520 kPa (800 psig), and most preferably at least 6900 kPa (1,000 psig), and typically will range from 3450 to 34500 kPa (500 to 5,000 psig) preferably from 4485 to 20700 kPa (650 to 3,000 psig) and most preferably from 4485 to 13800 kPa (650 to 2000 psig). The carbon monoxide pressure may be reduced by adding a catalyst such as a copper compound. The catalyst to polymer volume ratio can range from 0.25 to 4, preferably 0.5 to 2 and most preferably 0.75 to 1.3.

Preferably, the polymer, catalyst, nucleophilic trapping agent and CO are fed to the reactor in a single step. The reactor contents are then held for a desired amount of time under the pressure of the carbon monoxide. The reaction time can range up to 5 hours and typically 0.5 to 4 and more typically from 1 to 2 hours. The reactor contents can then be discharged and the product which is a Koch functionalized polymer comprising either a carboxylic acid or carboxylic ester or thiol ester functional groups separated. Upon discharge, any unreacted CO can be vented off. Nitrogen can be used to flush the reactor and the vessel to receive the polymer.

Depending on the particular reactants employed, the functionalized polymer containing reaction mixture may be a single phase, a combination of a partitionable polymer and acid phase or an emulsion with either the polymer phase or acid phase being the continuous phase. Upon completion of the reaction, the polymer is recovered by suitable means.

When the mixture is an emulsion, a suitable means can be used to separate the polymer. A preferred means is the use of fluoride salts, such as sodium or ammonium fluoride in combination with an alcohol such as butanol or methanol to neutralize the catalyst and phase separate the reaction complex. The fluoride ion helps trap the $BF_3$ complexed to the functionalized polymer and helps break emulsions generated when the crude product is washed with water. Alcohols such as methanol and butanol and commercial demulsifiers also help to break emulsions especially in combination with fluoride ions. Preferably, nucleophilic trapping agent is combined with the fluoride salt and alcohols when used to separate polymers. The presence of the nucleophilic trapping agent as a solvent minimizes tranesterification of the functionalized polymer.

Where the nucleophilic trapping agent has a pKa of less than 12 the functionalized polymer can be separated from the nucleophilic trapping agent and catalyst by depressurization and distillation. It has been found that where the nucleophilic trapping agent has lower pKa's, the catalyst, i.e. $BF_3$ releases more easily from the reaction mixture.

As indicated above, polymer which has undergone the Koch reaction is also referred to herein as functionalized polymer. Thus, a functionalized polymer comprises molecules which have been chemically modified by at least one functional group so that the functionalised polymer is (a) capable of undergoing further chemical reaction (e.g. derivatization) or (b) has desirable properties, not otherwise possessed by the polymer alone, absent such chemical modification.

It will be observed from the discussion of formula I that the functional group is characterized as being represented by the parenthetical expression

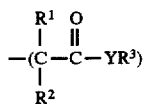

which expression contains the acyl group —CO—$YR^3$. It will be understood that while the —$CR^1R^2$— moiety is not added to the polymer in the sense of being derived from a separate reactant it is still referred to as being part of the functional group for ease of discussion and description. Strictly speaking, it is the acyl group which constitutes the functional group, since it is this group which is added during chemical modification. Moreover, $R^1$ and $R^2$ represent groups originally present on, or constituting part of, the 2 carbons bridging the double bond before functionalization. However, $R^1$ and $R^2$ were included within the parenthetical so that neo acyl groups could be differentiated from iso acyl groups in the formula depending on the identity of $R^1$ and $R^2$.

The derivatized polymer of the invention (i.e., the polymeric amide product formed by sequentially reacting functionalized polymer with a heavy polyamine, and then with a light amine) is typically used as a dispersant. When used to make dispersant, the hydrocarbon polymer is functionalized (via Koch) to have a functionality F typically not greater than about 3 and preferably not greater than 2, typically in the range of about 0.5 to 3, preferably about 0.8 to 2.0 (e.g., 0.8 to 1).

If used as a viscosity modifier, the derivatized polymer of the invention will typically have F greater than about 3, preferably greater than about 5, and typically in a range of about 5 to 10.

Derivatization by a Heavy Polyamine and a Light Amine

In the process of the invention, the functionalized polymer is sequentially reacted, first with a heavy polyamine to obtain a partially derivatized product and then with a light amine to complete the derivatization.

The heavy polyamine contains >28% N, more preferably >30% N, e.g. >32% N, and an equivalent weight of primary amine groups of between 120–160 g/eq, more preferably 120–150 g/eq, e.g. 125–140 g/eq. Best results are obtained when the polyamines contain more than 6 nitrogen atoms per molecule on the average (more preferably >7, e.g. >8 nitrogen atoms per molecule), and more than two primary nitrogens per molecule on the average (preferably >2.2, e.g. >2.4). The ideal spacings between the nitrogens are $C_2$–$C_3$ with $C_3$ preferred at the terminal ends of the polyamine.

Polyamines with these characteristics are commercially available and can be produced by distilling out the tetraethylenepentamine and most of the pentaethylenehexamine fractions from standard polyethyleneamine fractions from standard polyethyleneamine mixtures. Alternatively, they could be synthesized by cyanoethylation of the primary amine groups of polyethylene or polypropylene pentamines or hexamines followed by hydrogenation.

In a first process step, the functionalized polymer as heretofore described is reacted with the heavy polyamine in an amount and under conditions effective to form a derivatized product in which at least about 85%, preferably at least about 90% (e.g., 92–97%), more preferably at least about 95% (e.g., 95–98%), but less than all of the functional groups are derivatized; i.e., converted to heavy amide groups.

The reaction of the heavy polyamine and the functionalized hydrocarbon polymer is typically carried at a temperature in the range of from about 140° to 260° C., preferably from about 180 to 240, and most preferably from about 200 to 240 (e.g., 210° to 230° C.).

The reaction time will vary depending upon the temperature and the proportion of the functional groups to be derivatized but typically is in the range of about from 1 to 64 hours, wherein longer reaction times are typically required for lower reaction temperatures. The heavy polyamine is typically used in an amount of about 0.8 to 6, preferably 0.9 to 3, more preferably 1.1 to 2 (e.g., 1.2 to 1.6), and most preferably 1.1 to 1.5 (e.g., 1.2 to 1.4) equivalents of primary amine per equivalent of functional groups (e.g., ester groups) in the functionalized hydrocarbon polymer.

Solvents which are inert to the reactants and to the resulting derivatized product (e.g., mineral oil) may be employed. However, use of a solvent is typically not preferred, in order to avoid separating the solvent in a post-reaction step.

The reaction may be conducted at any suitable pressure from a partial vacuum to a pressure at or above atmospheric pressure.

In one embodiment, the reaction may be conducted with concurrent selective removal of the leaving group compound (i.e., the $HYR^3$ compound released by formation of the amide) in the manner disclosed in U.S. Ser. No. 261,507 (filed Jun. 17, 1994) and incorporated herein by reference. Concurrent removal of certain leaving group compounds (e.g., 2,4-dichlorophenol) has been found to shorten reaction time necessary to achieve a given level of conversion. Concurrent selective removal of the leaving group can be done, for example, by stripping with an inert gas (e.g., nitrogen) with or without partial vacuum or by distillation with or without a partial vacuum. The low volatility of the heavy polyamine compositions are particularly suited for this latter process.

The partially derivatized product resulting from the first reaction step, having less than all of the functional groups of the functionalized hydrocarbon polymer converted to heavy amide groups, is then reacted in a second reaction step with an excess of a light amine under conditions effective to complete the derivatization, i.e., to convert substantially all remaining functional groups to light amide groups. Complete derivatization means that at least about 97%, preferably at least 98% (e.g., 98 to 100%), more preferably at least 99% (e.g., 99.2 to 100%), and most preferably at least 99.5% are converted to amide groups comprising heavy amide groups and light amide groups.

The light amine is an amine having 2 to about 6, preferably 2 to 5, carbon atoms and 1 to about 3, preferably 2, amino groups, at least one of which is a primary amino group, or mixtures of such amines. The amine may contain functional groups other than amino groups (e.g., hydroxy), but is preferably an aliphatic or alicyclic hydrocarbyl amine. Suitable light amines include ethylamine, hydroxyethylamine, ethylene diamine, N,N-dimethylaminoethylamine, n-propylamine, isopropylamine, 1,3-diaminopropane (alternatively referred to herein as propylenediamine or PDA), 1,2-diaminopropane, N,N-dimethylaminopropylamine (or DMAP), n-butylamine, sec-butylamine, isobutylamine, 1,4-diaminobutane, n-pentylamine, n-hexylamine, 2-aminohexane, cyclohexylamine, diethylene triamine, and aminoethylpiperazine.

The preferred light amines are aliphatic amines selected from the group consisting of from $C_2$–$C_5$ diamines. The $C_2$–$C_3$ diamines are particularly preferred, and PDA and DMAP are most preferred light amines.

The light amines can also be characterized by their boiling points; i.e., they typically have a boiling point of less than about 220° C., and more typically less than about 180° C.

The light amines are also referred to herein as volatile amines, because they are volatile relative to the heavy polyamine employed in the first reaction step and relative to the derivatized products resulting from the process of the invention.

The reaction of the light amine with the partially derivatized product from the first reaction step is typically carried out at atmospheric or elevated pressure at a temperature in the range of from about 100° to 240° C., preferably from about 140° to 220° C., and more preferably from about 180° to 220° C. (e.g., 190° to 210° C.). The reaction time will vary depending upon the reaction temperature employed, the content of functional groups in the partially derivatized product, the amount of excess light amine employed, and so forth, but typically is in the range of from about 0.5 to 24 hours and more typically from about 2 to 12 hours (e.g., 2 to 10 hours). The light amine is used in an amount sufficient to provide more than one equivalent and preferably at least about 10 equivalents (e.g., 20 to 200 equivalents) of primary amine per equivalent of functional groups in the partially derivatized product.

In a typical procedure, the sequence of reactions is conducted in the same reactor system wherein, after the desired level of ester conversion to heavy amide has been achieved in the first step, the light amine is charged to the reactor and reacted with the partially derivatized product under conditions as heretofore described. The reactor system may be either a batch or continuous system. The rate of conversion of the ester to heavy and then light amide may be tracked during the sequential reactions using infrared spectroscopy (e.g., FTIR) to determine when to add the light amine and when the derivatization is complete.

Alternatively, discrete reactor systems can be employed for each step. For example, discrete batch reactors can be employed, wherein the reaction mixture containing the partially derivatized product, optionally after treatment to remove unreacted heavy amine, solvent, and/or reaction byproducts, is transferred from the first to the second batch reactor before, during or after addition of the light amine.

In a preferred embodiment of the process of the invention, the process further comprises the step of removing unreacted light amine from the completely derivatized product (i.e., the polymeric amide). The removal step typically comprises separating the light amine by distillation or inert gas stripping with or without a partial or full vacuum. An example of the method is to carry out the reaction to 95+% yield, and then add a volatile amine such as dimethylaminopropylamine in excess to complete the reaction. The excess amine is then removed by distillation.

The process of the invention has several advantages over processes in which the functionalized polymer is reacted in a single step with heavy polyamine. This process has the advantage of reducing the overall cycle time because second order reactions slow down considerably at the tail end of the reaction unless one of the reactants is present in excess. The small amount of ester (5%) not converted to a high nitrogen dispersant can often be neglected.

When a stoichiometric or near-stoichiometric amount of heavy polyamine is used in a single step reaction, the second-order reaction slows considerably as the heavy polyamine is depleted. Long reaction times and/or high reaction temperatures can be employed to drive the derivatization toward completion, but the use of high temperatures for prolonged periods can result in the decomposition of the heavy polyamine reactant or the amide-amine segment of the amide product, resulting in a loss of nitrogen content.

A relatively large excess of heavy polyamine can be used in a single step process to drive the reaction toward complete derivatization of the functionalized polymer. However, significant amounts of unreacted heavy polyamine will then remain in the product mixture. The presence of large amounts of unreacted polyamine in the product can be detrimental to use of the product in certain applications such as in diesel fuel and dispersant applications involving contact with elastomer seals. Separation of the unreacted heavy polyamine from the polymeric amide product can be difficult and/or expensive. For example, removal of heavy polyamine by distillation or stripping is often impractical due to its low volatility.

Completing or finishing the derivatization is not always necessary from the standpoint of the performance of the derivatized product as an additive in fuels and lubricating oils. For example, derivatizing functionalized polymer in a single step with heavy polyamine to convert a major portion (e.g., from about 85 to 95%) of the functional groups can give an amide product with sufficient nitrogen content for effective use in dispersant applications. However, the presence of unconverted functional groups in the product may be undesirable in certain circumstances. Consider, for example, an amide product obtained by partially derivatizing a polymer functionalized to contain —CO—$YR^3$ groups in which the $R^3$ is derived from a halo-substituted phenol represented by formula (V), such as halophenyl (e.g., 2-chlorophenyl and 4-chlorophenyl), dihalophenyl (2,4-dichlorophenyl), haloalkylphenyl (2-chloro-4-methylphenyl and 2-methyl-4-chlorophenyl), and the like. Such partially derivatized products will contain residual halogen (chlorine) which can make the product undesirable in additive applications because of environmental concerns.

The process of the invention solves these problems by use of a sequential two-step derivatization in which a major portion of the functional groups are derivatized with heavy polyamine, thereby incorporating sufficient nitrogen into the amide product for use in additive (e.g., dispersant) applications; the remaining functional groups are derivatized with light amine, thereby providing some additional nitrogen and substantially eliminating from the derivatized product the —CO—YR$^3$ (e.g., ester) groups which may be environmentally undesirable; and the overall reaction time is substantially reduced.

The invention also includes the polymeric amide product formed by the process of the invention.

Typical disclosures of polyamine reactants for the preparation of lubricant dispersants teach a range of nitrogens per molecule of from 1–12, a variety of spacing groups between the nitrogens, and a range of substitution patterns on the amine groups. We have discovered that polymeric amide products of the invention derived exhibit surprisingly enhanced dispersancy and/or viscometric properties relative to the prior art.

Preferred polymeric amide products are those derived from olefins of structure RHC=CH$_2$ where R is H or a hydrocarbon substituent containing from C$_1$ to C$_{16}$ with at least 30% of the olefin moieties comprising vinylidene groups.

As the molecular weight of a dispersant backbone is increased, the polar segment of the molecule becomes the limiting factor in dispersancy performance with polyamine systems of the prior art such as triethylenetetramine and tetraethylenepentamine. Increasing the stoichiometric ratio of amine to polymer raises the nitrogen content, but results in significant levels of free unreacted polyamine which is detrimental to diesel engine and elastomer seal performance. The amide products of the invention allow the benefit of the higher hydrodynamic volumes of high molecular weight dispersant backbones to be realized without the debit of limited nitrogen content in the polar group. Thus, these compositions are especially valuable as the degree of polymerization of the backbone increases above 25 especially above 40 (e.g., above 50).

Dispersants

Dispersants maintain oil insolubles, resulting from oil use, in suspension in the fluid thus preventing sludge flocculation and precipitation. Suitable dispersants include, for example, dispersants of the ash-producing (also known as detergents) and ashless type, the latter type being preferred. The derivatized polymer compositions of the present invention can be used as ashless dispersants and multifunctional viscosity index improvers in lubricant and fuel compositions.

Post Treatment

The derivatized polymers may be post-treated (e.g., borated). U.S. Ser. No. 992,403 discloses processes for post treatment and is incorporated herein by reference.

Lubricating Compositions

The additives of the invention may be used by incorporation into an oleaginous material such as fuels and lubricating oils. U.S. Ser. No. 992,403 is incorporated herein by reference for its disclosure of fuel and lubricating oil compositions and concentrates containing additives derived from functionalized polymers, and methods for preparing the compositions and concentrates. The compositions and concentrates therein described are applicable herein by substituting the additives of the present invention for additives the of U.S. Ser. No. 992,403. In particular, the present invention includes a fuel composition comprising a fuel and from about 0.001 to 0.5 wt. % of the additive of the invention, and a lubricating oil composition comprising a major amount of base oil and a minor amount, preferably from about 0.1 to 10 wt. %, of the additive of the invention.

The present invention will be further understood by the following examples which include preferred embodiments. In the following examples $\overline{M}_n$ and the ethylene content of the polymers were determined by carbon-13 NMR.

EXAMPLES

The following examples are representative of polymers functionalized via the Koch reaction and derivatized using heavy polyamine (HA-2).

Example 1

An ethylene/butene copolymer (46% ethylene, $\overline{M}_n$=300) prepared via Ziegler-Natta polymerization with zirconium metallocene catalyst and methyl alumoxane cocatalyst according to known procedures was carbonylated with carbon monoxide in the present of BF$_3$ and 2,4-dichlorophenol in a continuous stirred tank reactor at 50° C. The resulting ester was aminated with a prior art polyamine of 34.3% N and an equivalent weight of primary amine of 111 using a stoichiometry of 1.2 equivalents of primary amine per equivalent of ester by heating for 14–20 hours at 150°–230° C. under reflux and then removing the phenol given off by distillation. The product was diluted with base oil and borated using 7.9 parts of a 30% boric acid slurry in base oil, 118.6 parts of aminated polymer and 98 parts of base oil at 150° C. for 1–2 hours.

After filtration, the product contained 0.52% N and 0.18% B.

Example 2

Another dispersant was prepared from the same functionalized polymer described in Example 1 by reacting with a polyamine of the present invention having 32.4% N and an equivalent weight of primary amine of 129 using a stoichiometry of 1.2 equivalents of primary amine per equivalent of ester. The amine was added to the ester at 220° C. over a period of three hours and the reaction mixture was soaked for three hours at 220° C. Excess dimethylaminopropylamine (1.5 equivalent per equivalent of original ester) was then added and the reaction mixture was soaked for a further three hours and then stripped to remove the excess amine. The product was diluted with base oil, and borated as above with 11.2 parts of a 30% boric acid slurry per 140 parts of aminated polymer and 110.4 parts of base oil to give a product containing 0.57% N and 0.26% B after filtration.

Example 3

Another dispersant was prepared from an ethylene/butene copolymer (35% ethylene, $\overline{M}_n$=4000) which was carbonylated to a dichlorophenyl ester in a batch reactor. Amination was performed with a polyamine of the present invention of 32.8% N and equivalent weight of primary amine of 131 using a stoichiometry of 1.4 equivalents of primary amine per equivalent of ester 300° C. for 8 hours at a pressure of 2–4 mm removing the phenol as it formed. Last traces of phenol were distilled by stripping for an additional hour with nitrogen at 200° C. at atmospheric pressure. The product was diluted and borated using 1.33 parts of a 30% boric acid slurry in base oil, 16.4 parts of aminated polymer and 13.5 parts of base oil as above yielding a product containing 0.72% N and 0.21% B.

Example 4

A dispersant was prepared from an ethylene/butylene copolymer (51% E, $\overline{M}_n$=5500) which was carbonylated to a dichlorophenyl ester as in Example 7. Amination was performed with the same polyamine and stoichiometry as Example 7 at 200° C. for 12 hours at a pressure of 2–4 mm. After stripping residual phenol for an additional hour with nitrogen, the product was diluted with 1.1 parts of base oil per part of aminated polymer and filtered to give a product with 0.48% N.

Example 5

An ethylene-butene-1 copolymer (46 mole % ethylene, $\overline{M}_n=3300$) prepared via Ziegler-Natta polymerization of ethylene and butene-1 monomers in the presence of zirconium metallocene catalyst and methyl alumoxane cocatalyst was carbonylated with carbon monoxide in the presence of $BF_3$ and 2,4-dichlorophenol in a continuous stirred reactor at 50° C. to give a copolymer containing 2,4-dichlorophenyl ester functional groups (essentially 100% neo ester). The polymeric ester (equivalent weight=4,383) was aminated with a heavy polyamine (0.034 grams of polyamine per gram of polymeric ester) containing 32.8 wt. % nitrogen and 7.65 milliequivalents of primary amine per gram of polyamine, using a stoichiometry of 1.2 equivalents of primary amine per equivalent of ester by heating for 6 hours at 220° C. and subsequently stripping the 2,4-dichlorophenol leaving group by distillation. The product contained about 3% unreacted ester. The product was t hen mix ed with DMAP (0.040 grams of DMAP per gram of starting polymeric ester) and heated to 200° C. and maintained at 200° C. for three hours, and then stripped using nitrogen at 200° C. for 2 hours. The product contained essentially no ester according to FTIR. The final residue was diluted with base oil and borated using 111.6 grams of a 30 wt. % boric acid slurry in mineral oil at 150° C. for 3 hours. The filtered product contained 1.15 wt. % N, 0.26 wt. % B and 316 ppm Cl.

Example 6

An EB copolymer (45 mole % ethylene, $\overline{M}_n=1800$) prepared in a manner analogous to the EB polymer of Example 5 was carbonylated with carbon monoxide in the presence of $BF_3$ and 2-chloro-4-methylphenol in a continuous stirred reactor at 50° C. to give a copolymer containing 2-chloro-4-methylphenyl ester groups (essentially 100% neo ester). 300 grams of the polymeric ester were reacted with heavy polyamine (33.1 wt. % N and 7.88 meq. of primary amine per gram) using a stoichiometry of 1.4 equivalents of primary amine per equivalent of ester by heating for 24 hours at 200° C. under vacuum (0.5–1.0 mm Hg). This intermediate amide product analyzed for 2.80 wt. % N and 0.3 1 wt. % Cl, and contained 3.98% unreacted ester as measured by FTIR. 126 grams of the product was heated with 12.6 grams of PDA for 6 hours, beginning at 166° C. with the temperature rising after about two hours to 172° C. and to 180° C. by the end of the sixth hour. The final amide product contained 0.6% ester (FTIR) and, after stripping at 180° C. for 2 hours, analyzed for 2.87 wt. % N and 0.2 wt. % Cl.

100 grams of the final amide product were diluted with 118.65 grams of S150N mineral oil and heated to 150° C. 8.7 grams of 30 wt. % boric acid slurry in oil were added to the diluted product and the mixture soaked at this temperature for two hours. The stripped (one hour at 150° C.), filtered product contained 1.26 wt. % NO, 0.03 wt. % Cl, and 0.179 wt. % boron and had a kinematic viscosity of 71.85 centistokes at 100° C.

Example 7

126 grams of the intermediate amide product of Example 6 and 12.6 grams of DMAP were heated at reflux for six hours during which time the reflux temperature increased gradually from 180° to 200° C. The final amide product contained about 0.6% ester (FTIR) and, after stripping at 200° C. for 2 hours, contained 2.71 wt. % N and 0.11 wt. % Cl. The stripped final amide product was borated in the manner described in Example 6. The filtered product contained 1.21 wt. % N, 0.03 wt. % Cl, and 0.178 wt. % B, and had a kinematic viscosity of 77.35 cst at 100° C.

Example 8

An intermediate amide product with 3.55% unreacted ester, 2.76 wt. % N and 0.68 wt. % Cl was prepared by repeating the procedure of Example 6 with a different EB copolymer (45 wt. % ethylene, $\overline{M}_n$3300; essentially 100% neo ester therefrom). A mixture of the intermediate amide (125 grams) and PDA (12.5 grams) was refluxed for six hours with the temperature gradually rising from 160° to 164° C. during refluxing, after which there was only 0.8% ester remaining (FTIR). The stripped, final amide product (220° C. for 2 hours) contained 1.61 wt. % N and 0.29 wt. % Cl. A borated product with 1.26 wt. % N, 0.046 wt. % Cl, and 0.179 wt. % B and a kinematic viscosity of 71.85 cst at 100° C. was then obtained using the procedure described in Example 6.

Example 9

125 grams of the intermediate amide product of Example 8 and 12.5 grams of DMAP were heated at reflux for six hours during which time the reflux temperature increased gradually from 172° to 192° C. The final amide product contained about 0.68% ester (FTIR) and, after stripping at 200° C. for 2 hours, contained 1.48 wt. % N and 0.14 wt. % Cl. The stripped final amide product was borated in the manner described in Example 6. The filtered product contained 0.69 wt. % N, 0.044 wt. % Cl, and 0.17 wt. % B, and had a kinematic viscosity of 221 cst at 100° C.

Viscosity Measurements

Two 5W30 oils were formulated incorporating the dispersants of Example 1 and Example 2 along with the detergents, antioxidants, anti-wear agents, etc. typically used in a passenger car motor oil. The same additive components and treat rates of active ingredient were used in each case except that in Oil A the dispersant of Example 1 was used and in Oil B the dispersant of Example 2 was used. The dispersant in Oil B was also blended at a reduced concentration relative to that of Oil A (95%). The kinematic viscosities at 100° C. and the ccs viscosities at –25° C. were then adjusted to equivalent values by adjusting the amount of ethylene propylene viscosity modifier and base stock. Despite the fact that Oil B contained less active dispersant than Oil A, it required less viscosity modifier (92%) to reach the same kinematic viscosity target.

Engine Tests

The two oils of Examples A and B were compared in the standard ASTM sequence V–E engine test which is an industry measure of dispersant performance. Oil B, despite having less dispersant, equaled or exceeded the performance of Oil A in every category related to dispersant performance:

| Oil | Average Sludge | PSV | Average Varnish |
|---|---|---|---|
| A | 9.0 | 6.7 | 5.8 |
| B | 9.0 | 7.2 | 6.1 |

Average sludge, piston skirt varnish (PSV) and average varnish are merit ratings with the larger numbers being better.

Table 1 shows results of experimental dispersants derived from heavy amine in a typical SAE 10W30 lubricant oil formulation using Exxon basestocks. When compared to a reference oil the formulations tested showed a marked improvement in both sludge and varnish performance as measured in the ASTM Sequence V-E engine test. Average Sludge, Varnish and Piston Skirt Varnish are merit ratings with the larger numbers being better. In addition, the results demonstrated this improved performance at equal or reduced treat rates from the reference. Using the experimental dispersant the viscosity modifier treat rate as required to meet SAE 10W30 visiometric targets was also reduced.

TABLE 1

SAE 10W30 LUBRICATING OIL USING EXXON BASESTOCKS

| Dispersant Type | Comparative Reference | Example A Experimental with Heavy Polyamine | Example B Experimental with Heavy Polyamine | Example C Experimental with Heavy Polyamine |
|---|---|---|---|---|
| Dispersant Treat Rate @ 50% Al Mass % | 5.77 | 5.77 | 4.62 | 5.17 |
| V-E Engine Test Results | | | | |
| Avg. Sludge | 9.07 | 9.43 | 9.47 | 9.41 |
| Avg. Varnish | 5.12 | 6.74 | 6.75 | 6.72 |
| Piston Skirt Varnish | 6.68 | 6.95 | 6.68 | 7.06 |
| Viscosity Modifier Required Mass % | 6.0 | 2.0 | 1.5 | 2.0 |
| Kinematic Viscosity @ 100° C. | 10.45 | 10.39 | 10.60 | 10.81 |
| Cold Cranking Simulator (CCS) @ −20° C. | 3249 | 3276 | 3262 | 3376 |

What is claimed is:

1. A process for preparing a polymeric amide comprising the steps of:
   (A) reacting (i) a hydrocarbon polymer functionalized to contain functional groups of the formula —CO—Y—R$^3$, the hydrocarbon polymer having a number average molecular weight of at least about 500 prior to functionalization, wherein Y is O or S, R$^3$ is hydrogen, hydrocarbyl, or substituted hydrocarbyl and wherein at least 50 mole % of the functional groups are attached to a tertiary carbon atom of the polymer backbone, with (ii) a heavy polyamine in an amount and under conditions effective to form a partially derivatized product in which at least about 85% but less than all of the functional groups are converted to heavy amide groups; and
   (B) reacting the partially derivatized product with an excess of a light amine having 2 to about 6 carbon atoms and 1 to about 3 amino groups per molecule, at least one of the amino groups being a primary amino group, under conditions effective to convert substantially all remaining functional groups to light amide groups.

2. The process according to claim 1, further comprising the step of removing unreacted light amine after conversion to the light amide groups.

3. The process according to claim 1, wherein least about 95% of the functionalized groups are converted to heavy amide groups in the partially derivatized product.

4. The process according to claim 1, wherein the heavy polyamine comprises an equivalent weight of about 120 to 160 grams per equivalent of primary amine and at least about 28 wt. % nitrogen.

5. The process according to claim 1, wherein the heavy polyamine comprises less than about 1 wt. % $N_2$ to $N_5$ polyamines and less than about 25 wt. % hexamine.

6. The process according to claim 5, wherein the hydrocarbon polymer prior to functionalization comprises an ethylene α-olefin polymer of ethylene and at least one α-olefin having the formula $H_2C$=$CHR^4$ wherein $R^4$ is straight or branched chain alkyl comprising 1 to 18 carbon atoms and wherein at least about 50% of the polymer chains possess terminal vinylidene unsaturation.

7. The process according to claim 1, wherein the light amine comprises a member selected from the group consisting of $C_{2-C_5}$ diamines and $C_{2-C_6}$ monoamines.

8. The process according to claim 7, wherein the light amine comprises a member selected from the group consisting of ethylenediamine, propylenediamine and N,N-dimethylamino propylamine.

9. The process according to claim 1, wherein the hydrocarbon polymer prior to functionalization comprises an ethylene α-olefin polymer of ethylene and at least one α-olefin having the formula $H_2C$=$CHR^4$ wherein $R^4$ is straight or branched chain alkyl comprising 1 to 18 carbon atoms and wherein at least about 50% of the polymer chains possess terminal vinylidene unsaturation.

10. The process according to claim 9, wherein the number average molecular weight of the ethylene α-olefin polymer is from about 500 to 10,000.

11. The process according to claim 9, wherein the ethylene (α-olefin polymer comprises ethylene-butene-1 copolymer.

12. The process according to claim 10, wherein Y comprises O and R$^3$ comprises

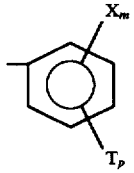

wherein each X is the same or different and is an electron withdrawing substituent, each T is the same or different and is a non-electron withdrawing substituent, and m and p are from 0 to 5 with the sum of m and p equal to 0 to 5.

13. The process according to claim 12, wherein X comprises halogen and T comprises alkyl.

14. The process according to claim 13, wherein R$^3$ comprises a halophenyl group selected from the group consisting of chlorophenyls, dichlorophenyls and chloromethylphenyls.

15. The process according to claim 14, wherein R$^3$ comprises a member selected from the group consisting of 2,4-dichlorophenyl and 2-chloro-4-methylphenyl.

16. The process according to claim 12, wherein the hydrocarbon polymer prior to functionalization comprises an ethylene α-olefin polymer of ethylene and at least one α-olefin having the formula $H_2C$=$CHR^4$ wherein $R^4$ is straight or branched chain alkyl comprising 1 to 18 carbon atoms and wherein at least about 50% of the polymer chains possess terminal vinylidene unsaturation.

17. The process according to claim 16, wherein the heavy polyamine comprises less than about 1 wt. % $N_2$ to $N_5$ polyamines and less than about 25 wt. % hexamine.

* * * * *

UNITED STATES PATENT AND TRADEMARK OFFICE
CERTIFICATE OF CORRECTION

PATENT NO. : 5,783,735
DATED : July 21, 1998
INVENTOR(S) : Emert et al.

It is certified that error appears in the above-identified patent and that said Letters Patent is hereby corrected as shown below:

IN THE CLAIMS:

Claim 7 column 24, line 13 of the Patent, "$C_{2}-C_{5}$ diamines and $C_{2-C6}$" should read -- $C_2-C_5$ diamines and $C_2^-C_6$ --

Claim 11, column 24, line 29 of the Patent, delete "("

Signed and Sealed this

Twenty-ninth Day of December, 1998

Attest:

BRUCE LEHMAN

Attesting Officer

Commissioner of Patents and Trademarks